Figure 1:
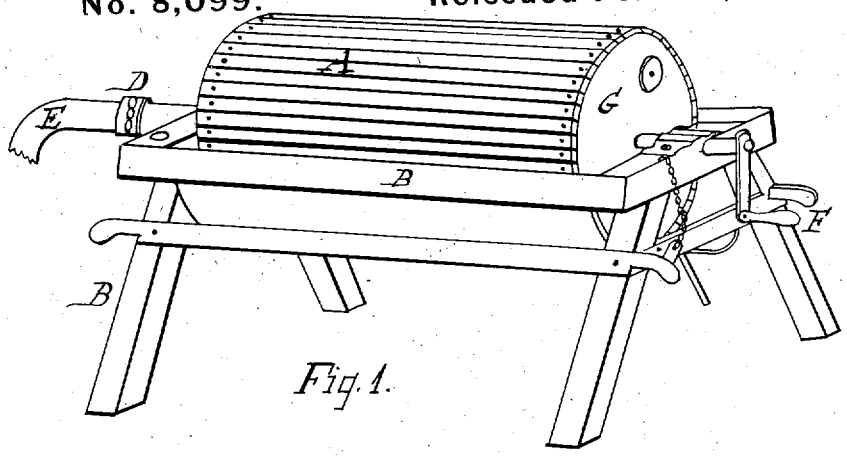

F. HINCKEL.

Assignor to E. D. BRAINARD.

Washing Shavings in Breweries.

No. 8,099. Reissued Feb. 26, 1878.

Witnesses.
James N. Hunter
H. Newell.

Inventor
Edwin D. Brainard

UNITED STATES PATENT OFFICE.

EDWIN D. BRAINARD, OF ALBANY, N. Y., ASSIGNEE OF FREDERICK HINCKEL.

IMPROVEMENT IN WASHING SHAVINGS IN BREWERIES.

Specification forming part of Letters Patent No. 85,526, dated January 5, 1869; Reissue No. 8,099, dated February 26, 1878; application filed February 11, 1878.

*To all whom it may concern:*

Be it known that FREDERICK HINCKEL, of Albany, in the State of New York, has invented a new and useful Process for Washing Brewers' Shavings, and also an apparatus connected therewith; and I do hereby declare that the following is a full, clear, and exact description thereof, reference being had to the accompanying drawings, forming part of this specification.

Brewers' "shavings," so called, are cut from selected varieties of wood, such as beech and sugar-maple. They are composed of thin strips of wood, and are prepared for use by being subjected to an alkali solution, in order to extract the tannin. In use they are introduced into the casks containing the beer required to be cleared of yeast-cells held in suspension therein. The yeast-cells held in suspension in the beer rapidly attach themselves to these shavings until, by reason of their greater specific gravity, such shavings no longer float on the beer, gradually sinking through the body of the same, carrying these attached yeast-cells with them. They finally reach the bottom of the cask. The beer is then racked off, and the shavings removed to be cleansed, in order to be used over again when required. While being cut these shavings come off the plank or other piece of timber more or less curved in form. This forcing off by the cutting-knife of the shaving in such a form causes its fibers to break, and thus presents on its surfaces numerous small incisions or small cuts. If such shavings are flattened out, these incisions close up; but if they are bent or curled a little, which latter condition is the case on their being inserted into the beer, these incisions will open out.

The yeast-cells during the process of clarification of the beer not only attach themselves to the outer surfaces of the shavings, but lodge within these small incisions, so as to be frequently hid from view.

The hand methods employed heretofore in washing tend rather to close up the incisions, and to retain these attached yeast-cells within them. The shavings have been cleansed, such as by rinsing them in tubs filled with water; but it and all equivalent methods were expensive by reason of the time consumed therein. There were, even with the greatest of care exercised, some of the yeast-cells left on the shavings. These cells soured the shavings, and thus contaminated the beer in which they were again introduced. The yeast-cells decompose more readily because of the wet condition of such shavings, due to their treatment with water.

It was found necessary with the methods of washing in use to taste some of the shavings, after treatment, with the end of the tongue, in order to determine if there were any yeast-cells present, or decomposition resulting therefrom, and, if found, either to throw away such shavings or to rewash them.

This improved process consists in so treating these shavings that not only are all yeast-cells washed from off the outer surfaces with rapidity, but also those which attach themselves within these incisions.

The improvements therefore consist, first, in treating these shavings loosely placed together in a vessel, such vessel being supplied with jets of water; second, in treating these shavings with jets of water while they are being rotated or reciprocated in a vessel; third, in apparatus containing means for producing jets of water within a vessel, such vessel being so constructed that it may be rotated on its axis or otherwise agitated while such jets are acting on the shavings that may be placed therein.

In the drawings is shown an apparatus by which the improved process may be carried out.

Figure 2:
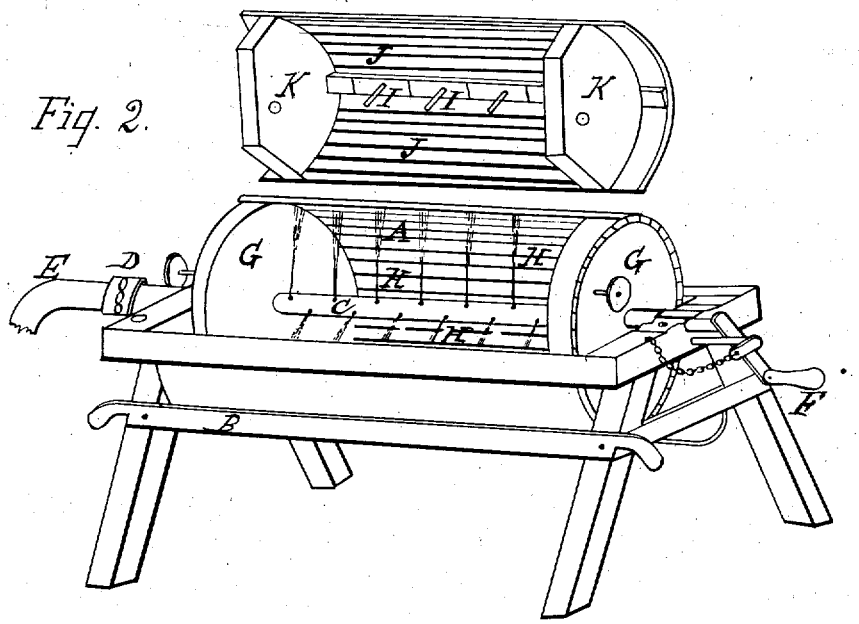

Figure 1 is an exterior view of such apparatus, and Fig. 2 is a perspective view with the cover of the vessel for holding the shavings shown removed.

A is a cylindrical vessel placed within the four sides of the frame B. Through the center of this vessel is a pipe, C, which pipe extends out at both ends of the vessel A, and is supported on the end pieces of the frame B. The pipe C is extended through one end of the frame B, and to it is screwed a thimble, D, so that a hose, E, may be attached thereto. At the other end of the pipe, and outside the frame B, is attached a crank, F. This construction will admit of a rotating or reciprocating action of the vessel A in such frame. The pipe C is perforated within the vessel A, in order that numerous small jets of water may pass through such pipe and into the body of the vessel A while water is being supplied to the pipe through the hose E. The body of the vessel A is composed of slats so attached to the circular end pieces G G that spaces H H, &c., will be left to allow the water to escape, but shall retain the shavings that may be inserted in such vessel to be cleansed.

Short pegs I I I may be placed on the interior periphery of the vessel at intervals, which will serve to assist the shavings to rise into the jets of water on the rotation or other agitation of the vessel A. A cover composed of the slats J J, &c., attached to the end pieces K K, is provided, which, when placed on the vessel A, preserves its cylindrical form, and allows nothing to escape except water.

The following is the operation of this apparatus: The shavings are put into the vessel A at the opening in its side, and the cover replaced on such opening. Water is then introduced through the hose E into the pipe C, and the vessel A rotated or otherwise agitated by the crank F. These shavings rest in the vessel in a loose condition, and on being set in motion by the rotation or other agitation of the vessel they will be exposed on every side to the action of the jets of water issuing from the numerous small orifices in the pipe C. These shavings, not being directly manipulated by the hand, or by any means that would compress them together or straighten them out, will not have the incisions contained on their surfaces closed, but open to the action of these jets of water, which jets, while the shavings are thus free from contact with anything except the vessel and their abrasion with each other, will reach the yeast-cells that may be retained in such incisions, as well as on the surfaces, and thus rapidly and effectually wash the shavings. Three or four minutes' rotation of the vessel will suffice to accomplish this end.

The progress of the work can be observed by the character of the water that issues from the openings in the sides of the vessel. At the end of the above-named period it leaves the vessel as pure as it was when it entered it.

I claim—

1. The process of treating brewers' shavings loosely placed together in a vessel supplied with jets of water, substantially as described.

2. The process of treating brewers' shavings with jets of water while such shavings are being rotated or agitated in a vessel, substantially as described.

3. The combination of a vessel capable of rotation on its axis with means for producing jets of water within it, substantially as described.

4. A vessel capable of rotation on its axis, in combination with a perforated pipe for producing jets of water within such vessel, substantially as described.

EDWIN D. BRAINARD.

Witnesses:
K. NEWELL,
JAMES H. HUNTER.